United States Patent [19]
Pomme et al.

[11] Patent Number: 6,145,339
[45] Date of Patent: Nov. 14, 2000

[54] REFRIGERATING FLUID LOOP, NOTABLY FOR AN AIR CONDITIONING INSTALLATION FOR A VEHICLE PASSENGER COMPARTMENT

[75] Inventors: Vincent Pomme, Montigny le Bretonneux; Bruno Hamery, Paris, both of France

[73] Assignee: Valeo Climatisation, La Verriere, France

[21] Appl. No.: 09/214,177

[22] PCT Filed: Apr. 28, 1998

[86] PCT No.: PCT/FR98/00854

§ 371 Date: Dec. 29, 1998

§ 102(e) Date: Dec. 29, 1998

[87] PCT Pub. No.: WO98/49502

PCT Pub. Date: Nov. 5, 1998

[30] Foreign Application Priority Data

Apr. 30, 1997 [FR] France .................................. 97 05394

[51] Int. Cl.[7] ........................................................ F25B 39/04
[52] U.S. Cl. .................................. 62/509; 62/527; 62/528
[58] Field of Search .............................. 62/527, 509, 528

[56] References Cited

U.S. PATENT DOCUMENTS

| | | | |
|---|---|---|---|
| 4,184,342 | 1/1980 | Pohl | 62/511 |
| 4,263,787 | 4/1981 | Domingorena | 62/528 |
| 4,311,020 | 1/1982 | Tobin et al. | 62/528 |
| 4,324,112 | 4/1982 | Fujiwara et al. | |
| 4,429,552 | 2/1984 | Reedy | 62/528 |
| 4,476,691 | 10/1984 | Ozu | 62/528 |
| 4,742,694 | 5/1988 | Yamanaka et al. | |
| 4,910,972 | 3/1990 | Jaster | |
| 5,025,640 | 6/1991 | Drucker | 62/528 |

FOREIGN PATENT DOCUMENTS

| | | |
|---|---|---|
| 2 707739 | 1/1995 | France . |
| 43 37 349 | 5/1994 | Germany . |

Primary Examiner—William Doerrler
Assistant Examiner—Mark Shulman
Attorney, Agent, or Firm—Morgan & Finnegan, L.L.P.

[57] ABSTRACT

The invention concerns a refrigerating fluid cycle comprising the standard compressor, condenser, liquid/gas separating reservoir, expansion device and evaporator. The invention is characterized in that a pre-expansion device is placed between the condenser and the reservoir, so as to reduce the fluid pressure until it reaches its saturation vapor pressure. The reservoir can thus contain a variable amount of liquid to compensate the fluid losses in the cycle by maintaining the sub-cooling temperature constant thereby enabling the heat load to be absorbed by the condenser.

15 Claims, 3 Drawing Sheets

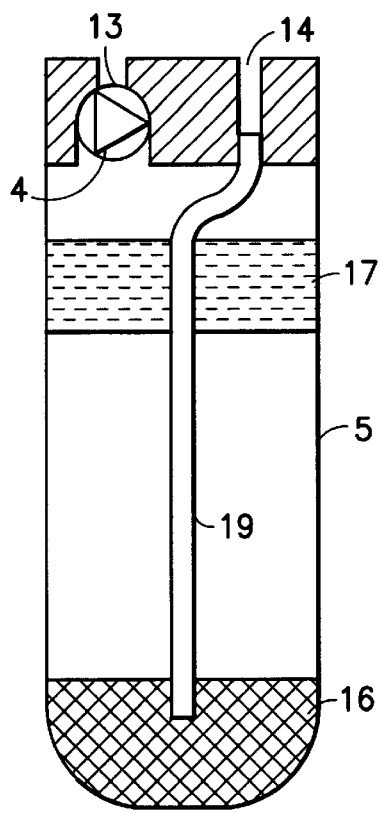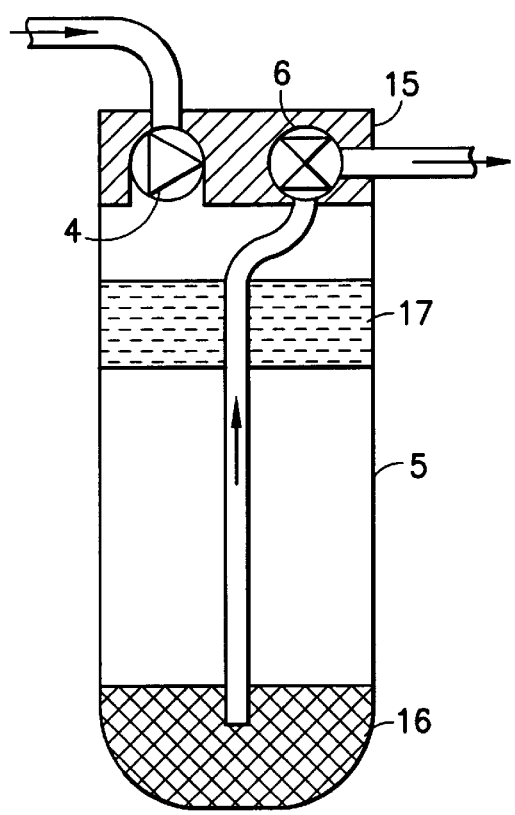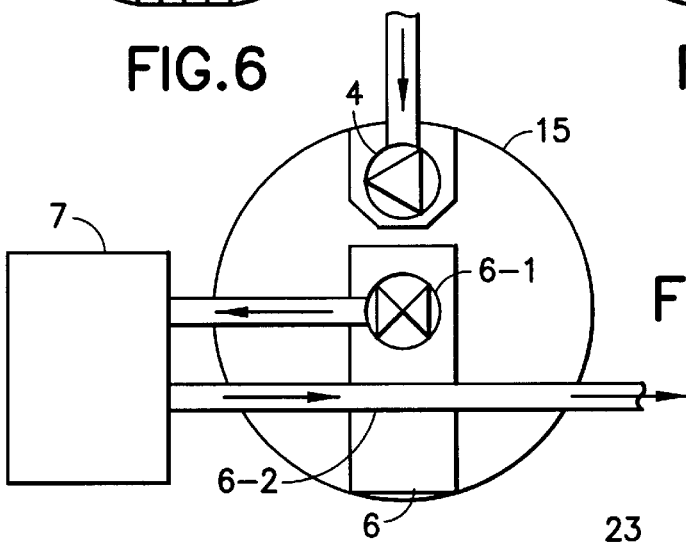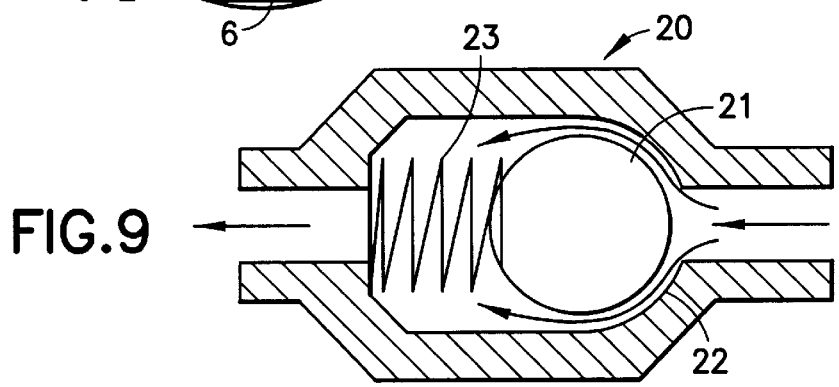
FIG. 6
FIG. 7
FIG. 8
FIG. 9

REFRIGERATING FLUID LOOP, NOTABLY FOR AN AIR CONDITIONING INSTALLATION FOR A VEHICLE PASSENGER COMPARTMENT

BACKGROUND OF THE INVENTION

The invention concerns a refrigerating fluid loop, notably for an air conditioning installation for a vehicle passenger compartment, comprising a compressor able to raise the pressure of the fluid to the gaseous state, a condenser able to condense the fluid compressed by the compressor and to sub-cool it to the liquid state, a separating reservoir able to separate the residual gas from the fluid in the liquid state coming from the condenser, a pressure reducer able to reduce the pressure of the fluid leaving the reservoir and an evaporator able to cause the fluid coming from the pressure reducer to change from the liquid state to the gaseous state before it returns to the compressor.

BRIEF SUMMARY OF THE INVENTION

FIG. 1 is a diagram depicting a thermodynamic cycle described by the refrigerating fluid in an air conditioning loop, placed in an enthalpy/pressure coordinate system. In this system, a bell-shaped curve L encloses an area of coexistence between liquid and gas whilst the fluid is entirely in the liquid state to the left of the left-hand side of the curve (low enthalpy) and entirely in the gaseous state to the right of the right-hand side (high enthalpy).

The cycle has substantially the shape of a rectangular trapezium with horizontal bases. From a point A situated in the gaseous region, the compressor brings the fluid to the gaseous state at a point B corresponding to higher enthalpy and pressure than those at point A. In the condenser, the fluid passes through a horizontal segment from point B to a point E situated in the liquid region, which segment passes through the right-hand and left-hand sides of the curve L at points C and D respectively. The segments BC, CD and DE correspond respectively to a desuperheating of the gaseous fluid, to condensation and to sub-cooling of the fluid to the liquid state. At the inlet to the evaporator, the fluid is at a point G situated in the liquid/gas region, corresponding to the same enthalpy value as point E and to the same pressure value as point A. In the evaporator, the fluid is brought to point A, passing, at H, through the right-hand side of the curve L.

In the known refrigerating loops of the above type, the fluid passes through the separating reservoir at point E in the thermodynamic cycle, and passes through the segment EG in the pressure reducer. Point E being situated in the liquid region, the reservoir is then entirely filled with liquid and the quantity of fluid which it contains cannot vary. When the total weight of refrigerating fluid contained in the loop increases, notably because of leakages in the circuit, this reduction takes place notably at the expense of the condenser, whose sub-cooling capacity is thus reduced, which has the effect of raising the enthalpy level of the fluid at the outlet from the condenser and at the inlet to the evaporator and consequently reducing the useful heat absorbed by the fluid in the evaporator.

One solution to this problem consists of moving away from the above architecture by interposing the separating reservoir between a condensation part and a sub-cooling part of the condenser, so that the thermodynamic state of the fluid in the reservoir corresponds to point D in the cycle, situated on the saturation curve, which enables the reservoir to contain a quantity of fluid which is able to vary according to the total weight of fluid in the circuit.

The aim of the invention is to obtain this same result, in a loop as defined in the introduction.

To this end, the invention provides that such a refrigerating fluid loop also comprises a preliminary pressure reduction device interposed between the condenser and the reservoir, able to reduce the pressure of the fluid to its saturation vapour pressure.

The preliminary pressure reducing device brings the fluid from the thermodynamic state corresponding to point E to the one corresponding to point F, once again situated on the saturation curve, a state in which consequently the fluid contained in the separating reservoir is situated. The pressure reducer next brings the fluid from point F to point G.

It should be noted that the loop according to the invention prevents the point representing the thermodynamic state of the fluid contained in the reservoir from entering the liquid region. This is because, if it tends so to do, the result is an increase in the quantity of liquid in the reservoir and consequently a reduction in the quantity of fluid in the condenser and a limitation to the sub-cooling, which shifts the segment EG to the right and consequently returns the point representing the state of the fluid in the reservoir to the saturation curve.

Optional characteristics of the invention, complementary or alternative, are set out below:

The condenser and reservoir are disposed at a distance from each other and the preliminary pressure reducing device is placed directly at the outlet from the condenser and is connected to the reservoir by a connecting conduit.

The condenser, the preliminary pressure reducing device and the reservoir are disposed at a distance from each other and connected together by connecting conduits.

The condenser and reservoir are disposed at a distance from each other and the preliminary pressure reducing device is placed directly at the inlet to the reservoir and is connected to the condenser by a connecting conduit.

The condenser, the preliminary pressure reducing device and the reservoir form a single-piece assembly and the preliminary pressure reducing device is placed directly at the outlet from the condenser and at the inlet to the reservoir.

The said pressure reducer is a thermostatic pressure reducer having a passage opening which can be regulated according to the state of the fluid leaving the evaporator, and the preliminary pressure reducing device, the reservoir and the thermostatic pressure reducer form a single-piece assembly.

The preliminary pressure reducing device consists of a constriction in the path of the fluid between the condenser and the reservoir.

The preliminary pressure reducing device consists of a valve able to produce a pressure drop which is substantially independent of the flow rate of the fluid.

BRIEF DESCRIPTION OF THE DRAWING

The characteristics and advantages of the invention will be disclosed in more detail in the following description, referring to the accompanying drawings, in which:

FIGS. 4 to 8 are schematic representations showing different possibilities for locating the preliminary pressure reducing device; and FIG. 9 is a view in section of a preliminary pressure reducing device in the form of a calibrated valve.

DETAILED DESCRIPTION OF DRAWINGS

Figure 3:
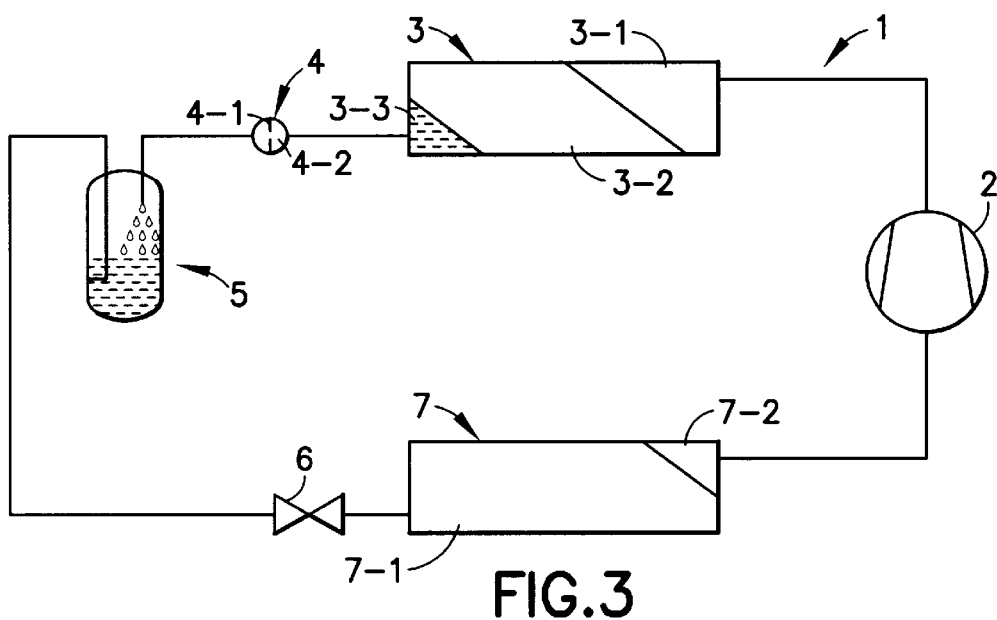
FIG. 3 is a diagram of a refrigerating fluid loop according to the invention.

The loop 1 depicted schematically in FIG. 3 comprises a compressor 2, a condenser 3, a preliminary pressure reducing device 4, a separating reservoir or "bottle" 5, a pressure reducer 6 and an evaporator 7, through which the refrigerating fluid travels in this order. The lower part of the reservoir 5 is filled with fluid in the liquid state, the residual gas entering the reservoir remains above the liquid level and only fluid in the liquid state is taken off below this level in order to be sent to the pressure reducer 6. In the condenser 3 there are indicated schematically a desuperheating part 3-1 where the fluid in the gaseous state coming from the compressor is cooled to the liquid-gas equilibrium pressure, a condensation part 3-2 where the fluid is condensed to the equilibrium pressure, and a sub-cooling part 3-3 where the fluid in the liquid state is cooled below the equilibrium pressure. Likewise, the evaporator 7 comprises a vaporisation part 7-1 and a superheating part 7-2.

Figure 2:
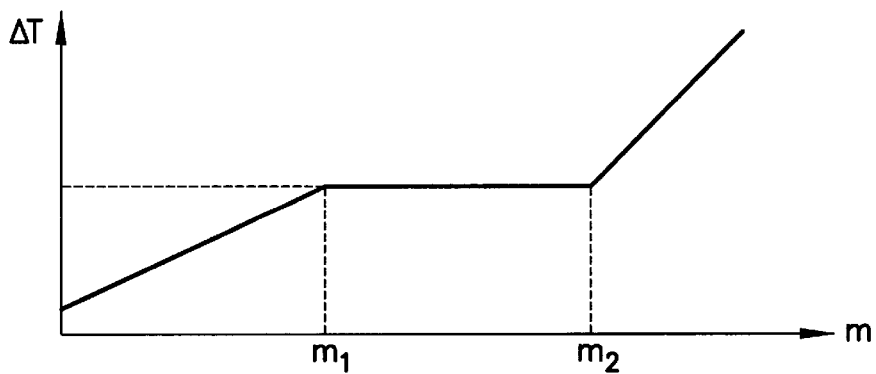
FIG. 2 is a diagram showing the variation in the degree of sub-cooling produced by the condenser as a function of the weight of fluid in a loop according to the invention.

FIG. 2 supplies a curve representing the variation in the difference ΔT between the liquid/gas equilibrium temperature in the condenser (condensation temperature) and the temperature of the fluid at the outlet from the condenser, after sub-cooling, as a function of the weight m of fluid contained in a loop according to the invention. This curve is formed by a first part rising to a value $m_1$, a second horizontal part from $m_1$ to $m_2$ and a third rising part beyond $m_2$. The level stage is obtained by virtue of the variation in the quantity of fluid contained in the reservoir 5, the values $m_1$ and $m_2$ corresponding respectively to the minimum and maximum levels therein. The degree of sub-cooling, and consequently the performance of the loop, remains substantially constant until leakages return the weight of fluid to $m_1$. The initial weight of fluid is chosen preferably around $m_2$ so that the duration of stable functioning is as long as possible. The length of the level stage is itself a function of the liquid/gas separation capacity and of the volume of the reservoir.

Figure 1:
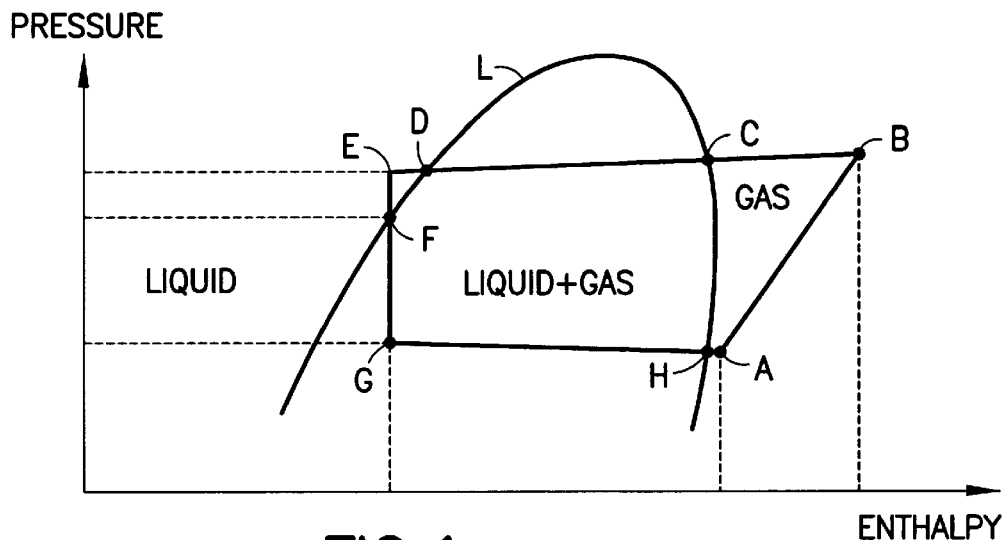
FIG. 1 is a thermodynamic diagram which has already been commented on above.

For the known loop described above, in which the thermodynamic state of the fluid in the separating reservoir corresponds to (FIG. 1) point E of the cycle, the level stage of the curve in FIG. 2 does not exist and the degree of sub-cooling varies continuously with the quantity of fluid.

The preliminary pressure reducing device is depicted by way of example in the form of a diaphragm 4-1 disposed across the fluid path and having an orifice 4-2. This diaphragm can be replaced by a length of pipe having an inside diameter which is reduced compared with the pipe connecting the reservoir 5 and pressure reducer 6, for example a diameter of 2 to 3 mm instead of 6 mm.

As shown schematically in FIG. 3, the condenser 3, the preliminary pressure reducing device 4 and the reservoir 5 can be disposed at a distance from each other and connected together by connecting conduits.

Figure 4:
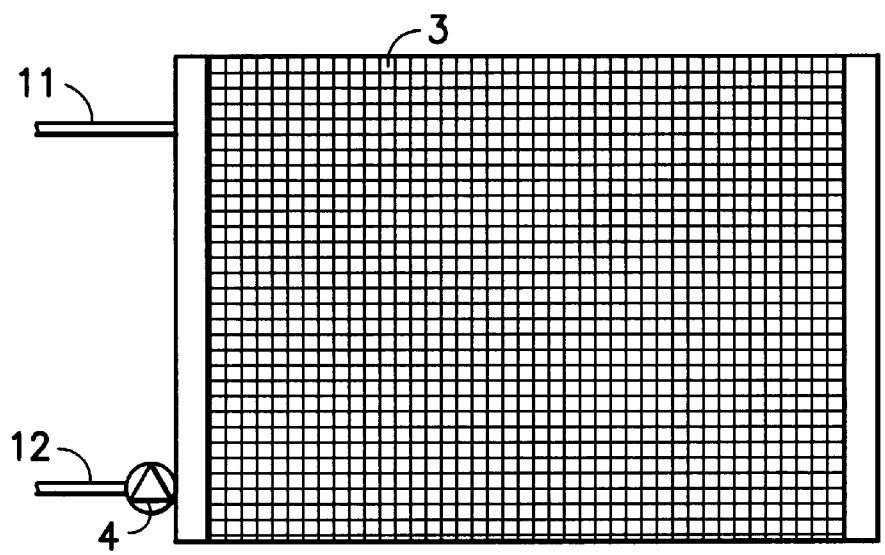

By way of variant, FIG. 4 shows a condenser 3 at the outlet of which the preliminary pressure reducing device 4 is integrated, the inlet of the condenser and the outlet of the preliminary pressure reducing device 4 being connected to the compressor and to the reservoir (not shown) by respective conduits 11 and 12.

Figure 5:
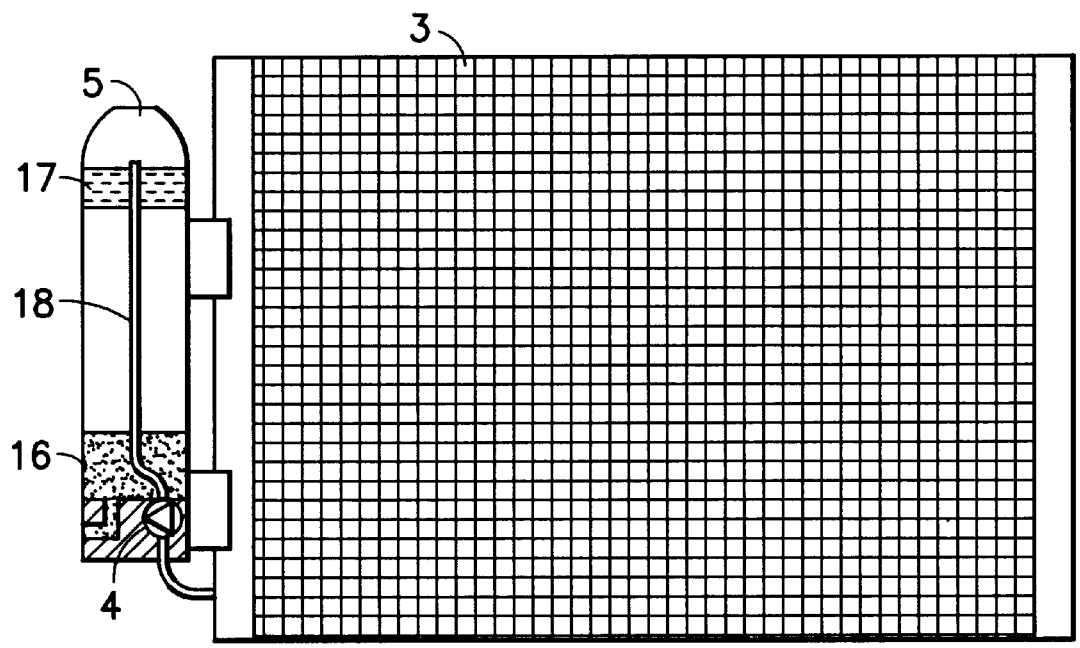

FIG. 5 depicts a single-piece assembly formed by a condenser 3, a separating reservoir 5 and a preliminary pressure reducing device 4 connected directly to the outlet of the condenser and to the inlet of the reservoir.

In the example layout according to FIG. 6, the preliminary pressure reducing device 4 is integrated at the inlet of the separating reservoir 5. The inlet 13 of the preliminary pressure reducing device and the outlet 14 of the reservoir can be connected to the condenser and to the pressure reducer, not shown, by respective conduits.

FIGS. 6 and 7 show schematically, respectively in vertical section and in plan view, a single-piece assembly comprising a preliminary pressure reducing device 4, a separating reservoir 5 and a thermostatic pressure reducer 6. As shown in FIG. 8, the thermostatic pressure reducer 6 comprises, in a known fashion, a pressure reducing chamber 6-1 and a control chamber 6-2, through which the fluid passes respectively on its path from the reservoir 5 to the evaporator 7 and from its path from the evaporator to the compressor, the pressure reducing action exerted in the pressure reducing chamber 6-1 being regulated according to the temperature and/or pressure of the fluid in the chamber 6-2. In the example depicted, the preliminary pressure reducing device 4 and the pressure reducer 6 are integrated into a block 15 upwardly limiting the internal volume of the reservoir 5. The outlet of the preliminary pressure reducing device and the inlet of the pressure reducing chamber 6-1 are merged respectively with the inlet and outlet of the reservoir 5.

In each of FIGS. 5 to 7, a volume of fluid in the liquid state 16 can be seen, occupying the lower part of the reservoir 5, and a filtering and drying element 17 disposed above the liquid level. In FIG. 5, the inlet and outlet of the reservoir are at the lower part. The fluid entering the reservoir is brought by a tube 18 above the filter 17, which the liquid must pass through from top to bottom in order to collect in the base of the reservoir, and then leave it directly through the lower outlet. In FIGS. 6 and 7, the inlet and outlet are disposed at the upper part. The fluid directly enters the space disposed above the filter 17, and the liquid is brought by a tube 19 from the lower part to the upper part. In general terms, the inlet and outlet can be disposed at any points on the separating reservoir, provided that the fluid is released above the filter 17 and taken off below the level of the liquid 16.

The pressure drop produced by the preliminary pressure reducing device with diaphragm illustrated schematically in FIG. 3 is an increasing function of the fluid flow rate. If a constant pressure drop is required, a preliminary pressure reducing device can be adopted having a passage opening which is an increasing function of the flow rate, such as the one illustrated in FIG. 9. This device 20 comprises a ball 21 forced towards a seat 22 by a helical spring 23 so as to close off the passage of fluid. The fluid pressure tends to move the ball away from its seat by compressing the spring 23. Naturally, the device in FIG. 9 has been described only by way of example and can be replaced by any substantially equivalent known device.

The fitting of the preliminary pressure reducing device immediately at the outlet of the condenser and/or immediately at the inlet of the reservoir, and/or the arrangement of the pressure reducer immediately at the outlet of the reservoir, as described in relation to FIGS. 4 to 8, are advantageous in that they simplify the assembly of the loop and reduce the number of fluidtight connections to be provided.

What is claimed is:

1. A refrigerating fluid loop, for an air conditioning system comprising a compressor able to raise the pressure of the fluid to the gaseous state, a condenser able to condense the fluid compressed by the compressor and to sub-cool it to the liquid state, a separating reservoir able to separate the residual gas from the fluid in the liquid state coming from the condenser, a pressure reducer able to reduce the pressure of the fluid leaving the reservoir and an evaporator able to cause the fluid coming from the pressure reducer to change from the liquid state to the gaseous state before it returns to the compressor, and a preliminary pressure reducer interposed between the condenser and the reservoir, able to reduce the pressure of the fluid to its saturation vapour pressure.

2. A loop according to claim 1, wherein the condenser and reservoir are disposed at a distance from each other and the preliminary pressure reducer is placed directly at the outlet from the condenser and it connected to the reservoir by a connecting conduit.

3. A loop according to claim 1, wherein the condenser, the preliminary pressure reducer and the reservoir are disposed at a distance form each other and connected together by connecting conduits.

4. A loop according to claim 1, wherein the condenser and reservoir are disposed at a distance from each other and the preliminary pressure reducer is placed directly at the inlet to the reservoir and is connected to the condenser by a connecting conduit.

5. A loop according to claim 1, wherein the condenser, the preliminary pressure reducer and the reservoir form a single-piece assembly and the preliminary pressure reducer is disposed directly at the outlet from the condenser and at the inlet to the reservoir.

6. A loop according to claim 4, wherein the pressure reducer is a thermostatic pressure reducer having a passage opening which can be regulated according to the state of the fluid leaving the evaporator, and the preliminary pressure reducer, the reservoir and the thermostatic pressure reducer form a single-piece assembly.

7. A loop according to claim 1, wherein the preliminary pressure reducer comprises a constriction in the path of the fluid between the condenser and the reservoir.

8. A loop according to claim 1, wherein the preliminary pressure reducer comprises a valve able to produce a pressure drop which is substantially independent of the flow rate of the fluid.

9. A loop according to claim 5, wherein, the pressure reducer is a thermostatic pressure reducer having a passage opening which can be regulated according to the state of the fluid leaving the evaporator, and the preliminary pressure reducer, the reservoir and the thermostatic pressure reducer form a single-piece assembly.

10. A refrigerating fluid loop for an air conditioning system comprising:
a separating reservoir for separating the residual gas from the fluid in the liquid state coming from the condenser,
a preliminary pressure reducer disposed between the condensor and the separating reservoir for reducing the pressure of the fluid to its saturation vapor pressure, wherein the preliminary pressure reducer is placed directly at an inlet of the reservoir and is connected to the condenser by a connecting conduit.

11. The loop according to claim 10 further comprising a pressure reducer for reducing the pressure of the fluid leaving the reservoir, the pressure reducer being placed directly at an outlet of the reservoir.

12. The loop according to claim 11 wherein the preliminary pressure reducer, the reservoir and the pressure reducer are a single-piece assembly.

13. The loop according to claim 10 wherein the preliminary pressure reducer has a device for closing a fluid passage of the preliminary pressure reducer so that a constant pressure drop is produced.

14. The loop according to claim 13 wherein the device comprises a spring and a member configured to engage with the fluid passage wherein the spring exerts a constant force on the member to close the fluid passage.

15. The loop according to claim 10, wherein the separating reservoir has a filtering and drying element disposed therein and above a volume of filtered refrigerating fluid, the fluid entering the separating reservoir is released above the filtering and drying element, and the fluid is withdrawn from underneath a top surface of the volume of filtered refrigerating fluid.

* * * * *

UNITED STATES PATENT AND TRADEMARK OFFICE
CERTIFICATE OF CORRECTION

PATENT NO. : 6,145,339
DATED : November 14, 2000
INVENTOR(S) : Pomme et al.

It is certified that error appears in the above-identified patent and that said Letters Patent is hereby corrected as shown below:

ON THE TITLE PAGE

Under Item [73] Assignee:

Delete "Valco Climatisation, La Verriere, France" and insert therefor --Valeo Climatisation, La Verriere, France--.

Signed and Sealed this

Eighth Day of May, 2001

*Attest:*

NICHOLAS P. GODICI

*Attesting Officer*     *Acting Director of the United States Patent and Trademark Office*